United States Patent [19]
Cheong et al.

[11] Patent Number: 5,754,885
[45] Date of Patent: May 19, 1998

[54] APPARATUS AND METHOD FOR SELECTING ENTRIES FROM AN ARRAY

[75] Inventors: Hoichi Cheong; Tom Tien-Cheng Chiu; Hung Qui Le; Donald George Mikan, Jr., all of Austin, Tex.

[73] Assignee: International Business Machines Corporation, Armonk, N.Y.

[21] Appl. No.: 627,653

[22] Filed: Apr. 4, 1996

[51] Int. Cl.⁶ .................... G06F 9/46; G06F 12/10
[52] U.S. Cl. .................... 395/846; 365/200; 365/238.5
[58] Field of Search .................. 395/200.15, 200.18, 395/183.19, 448, 494, 445, 417, 587, 383, 446, 394, 800, 185.03, 553, 674, 825, 200.37, 200.57, 384, 589, 200.52; 364/DIG. 1, DIG. 2, 243.4; 371/51.1, 10.3, 21.2; 711/118; 365/227, 49, 200, 230.02

[56] References Cited

U.S. PATENT DOCUMENTS 4,740,971 4/1988 Tam et al. .................... 371/10.3
5,353,426 10/1994 Patel et al. .................... 395/445
5,410,669 4/1995 Diggs et al. .................... 395/445

*Primary Examiner*—Daniel H. Pan
*Attorney, Agent, or Firm*—Kelly K. Kordzik; Winstead Sechrest & Minick P.C.; Anthony V. S. England

[57] ABSTRACT

Control circuitry is used to select M entries from an N-entry storage array by viewing the array from both ends. Beginning at both ends of the array, particular bit values or entry content is looked for by the control logic. Once found at both ends, these entries are then used to produce control signals to be sent to a pair of muxes to remove these entries. Then a subset of the original array consisting of the remaining entries of the array is then iterated upon by a similar set of control circuitry for finding and removing the next M entries from the storage array.

17 Claims, 5 Drawing Sheets

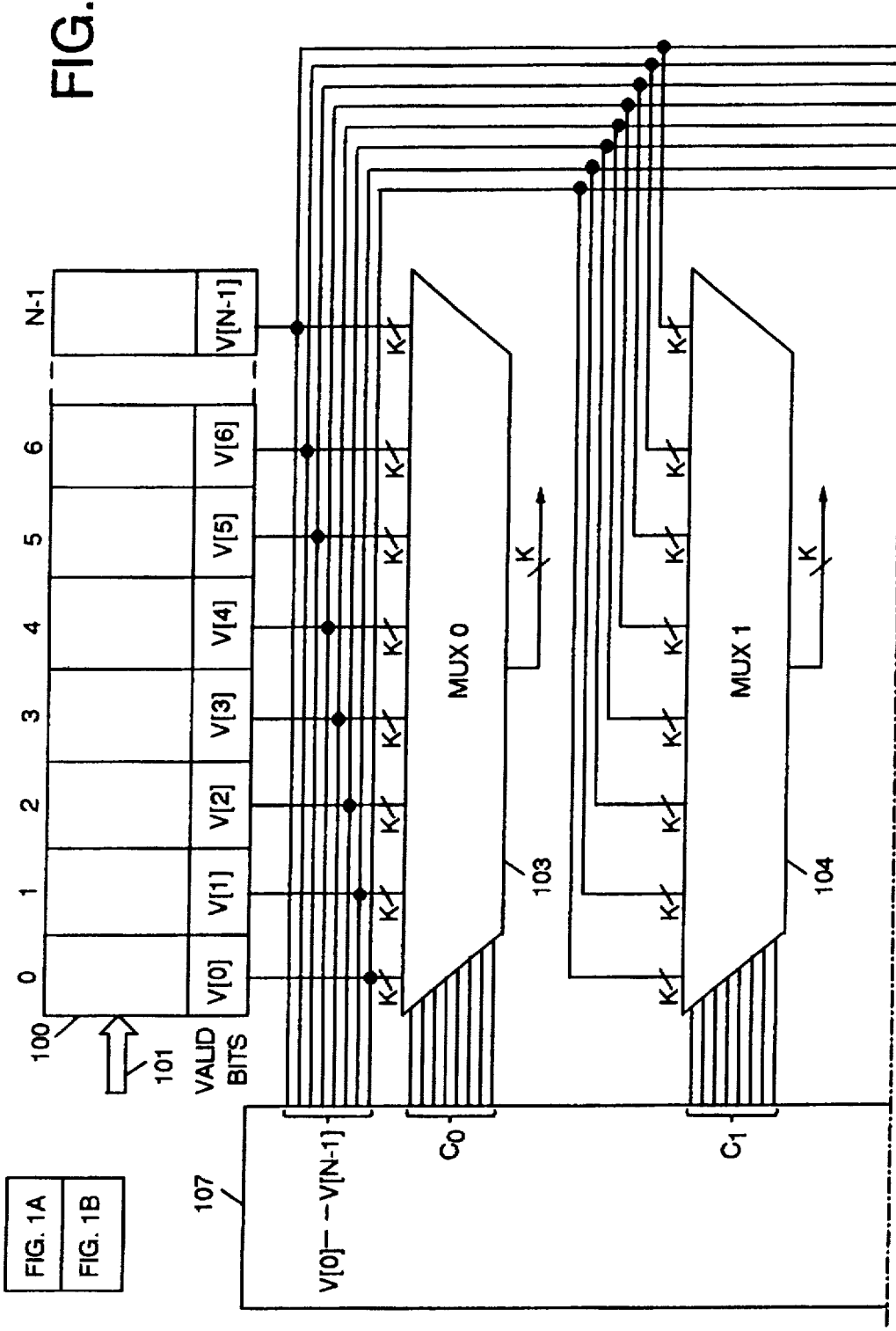

APPARATUS AND METHOD FOR SELECTING ENTRIES FROM AN ARRAY

TECHNICAL FIELD

The present invention relates in general to data processing systems, and in particular, to an apparatus and method for selecting M entries from an N-entry storage array.

BACKGROUND INFORMATION

Within a data processing system, there is usually a goal to design circuitry within a processor that is efficient and has low power requirements. One of these goals for increasing efficiency includes minimizing the number of cycles needed for any action taken within a processor.

One action often implemented within a processor, or within any other logic circuitry, is the selection of M entries from N entries in logic. For example, some type of storage array, such as a completion queue in a processor or a group of registers, may hold N entries (e.g., bytes, words, longwords, etc.). There is often a requirement to remove certain ones of these entries. For example, in a completion queue, upon the completion and retiring of requests, such entries are removed from the completion queue. When performing such a task, the selection circuitry may choose the certain ones of the entries to be removed by looking for a particular tag or identifier associated with the entries to be removed. One such identifier may be a valid bit which is known in the art. Thus, there may be an implementation whereby M entries within an N-entry array having associated valid bits may be selected for removal from the N-entry storage array.

The selection of M valid entries from N entries in logic can be prohibiting within a cycle if M is large. To find the M sets of N control signals needed to select the M entries can be an iterative process with M iterations. If M is large, it is difficult to meet desired cycle time constraints.

Thus, there is a need in the art for an improved, more efficient process for selecting M entries from an N-entry array.

SUMMARY OF THE INVENTION

The present invention satisfies the foregoing need by reducing in half the cycle time needed to select M entries from an N-entry array. This is performed by implementing control circuitry, which (1) monitors identifier bits, such as valid bits, associated with each of the entries in the N-entry array, and (2) produces control signals to be sent to M multiplexors coupled to the array. Each control signal is sent to a separate multiplexor for selecting one of the M entries having a particular identifier to be retrieved from the storage array.

In an embodiment of the present invention, the content of certain bits in each entry, or associated with each entry, of the array may be monitored. The control circuitry is searching for a particular pattern within this content. As each of the entries in the array is traversed by the control circuitry, when a predetermined pattern is reached a first control signal is produced for controlling one of the multiplexors so that it will select that entry associated with the predetermined content value for outputting that entry. This is done repeatedly until M entries having the predetermined content searched by the control circuitry are retrieved from the array.

In another embodiment of the present invention, the control circuitry searches for this particular content at both ends of the array simultaneously. When an entry having the predetermined content is found at each end of the array, two control signals are produced, which notify two multiplexors to select one each of the two entries in the array having the predetermined content value.

A masking process is then performed which essentially masks out the two ends of the array up to and including the entries previously selected. The selection process is then repeated for this subset of the entries of the N-entry array in order to produce two more control signals for two more multiplexors for selecting two more entries having the desired content associated with their entries. This process may be repeated until M entries are selected.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWING

For a more complete understanding of the present invention, and the advantages thereof, reference is now made to the following descriptions taken in conjunction with the accompanying drawings, in which:

FIGS. 1, 1A-B illustrate in block diagram form an embodiment of the present invention;

DETAILED DESCRIPTION

Figure 1B:
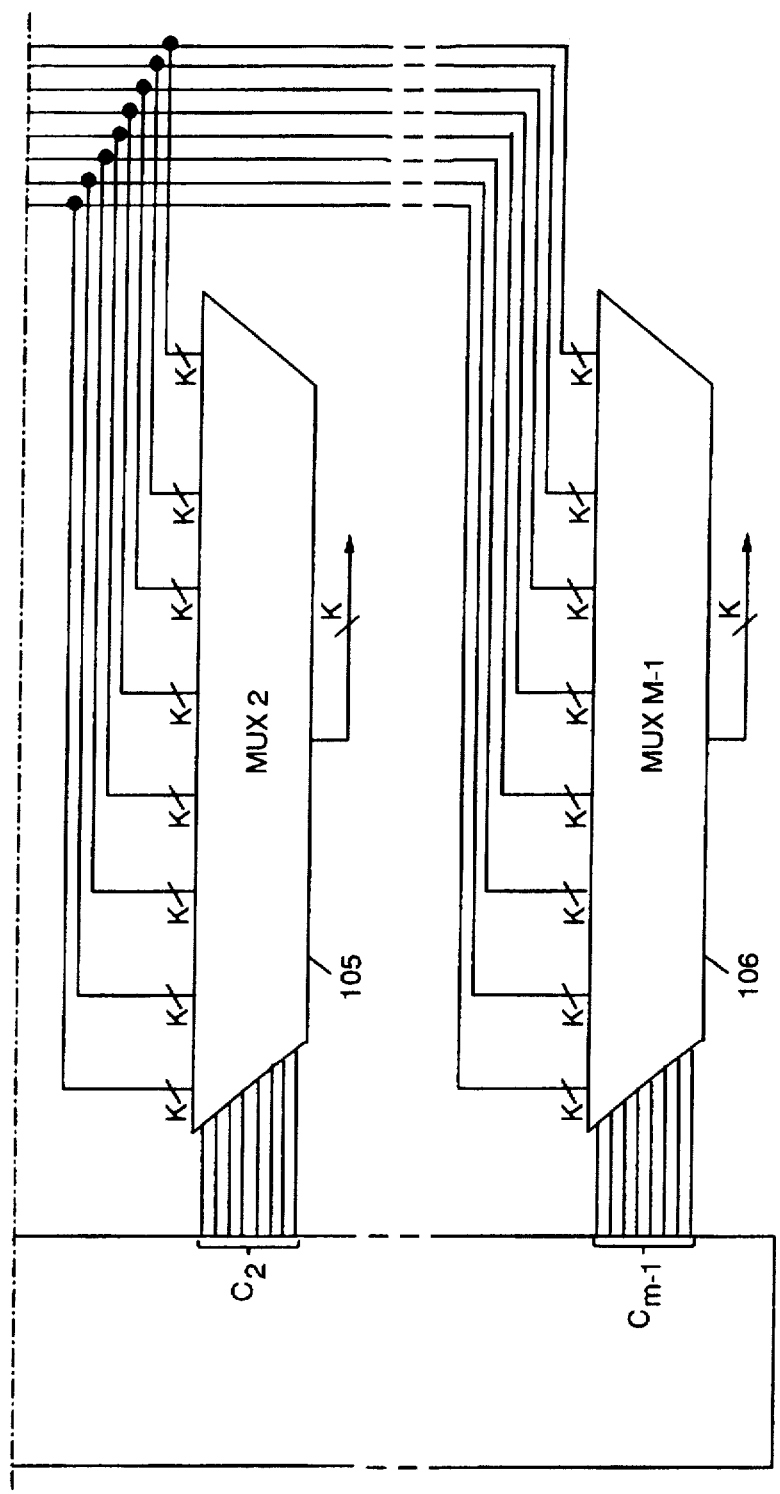

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring to FIG. 1, there is illustrated an embodiment of the present invention for selecting M entries from N entries in an array. N-entry array 100 may be a storage array for storing K-bit entries 0 through N−1. Such entries are stored in array 100 via bus 101.

Associated with each of the N entries in array 100 are valid bits V[0] through V[N−1] (also referred to herein as valid bit vector V[0], . . . , V[N−1]). The use of valid bits is well-known in data processing systems. Note, however, the remainder of the discussion with respect to the use of these valid bits is also applicable for an array that utilizes some other type of indicator bit(s) associated with stored entries, such as tag bits. Also, the present invention may monitor, in a manner discussed below, any portion of the content of each of the entries in array 100 for determining which entries to select.

As noted above, the valid bits represent a valid bit vector V[0], . . . , V[N−1]. Such a valid bit vector may comprise any structure, but in this example is an N×1 vector array.

The present invention may be configured to select M valid entries from array 100. This is performed by control circuitry 107, which monitors the valid bit vector and utilizes the valid bit vector entries to produce control vectors for controlling operation of muxes 103–106. Each of muxes 103–106 has N inputs coupled to each of the N entries of array 100. Each of muxes 103–106 may select one of the N entries in array 100 for output.

As briefly discussed above, each of the N entries in array 100 has an associated valid bit. The task of the present invention is to take M of the entries with a valid bit asserted and drive each of those M entries out of a unique multiplexor. Therefore, there are M multiplexors 103–106 each with N entries as input. Therefore, from the N valid bits, control circuitry 107 is to generate M sets of N control select signals to be sent to muxes 103–106. No two muxes will select the same entry. If there are less than M valid entries, some of muxes 103–106 will receive a control vector having all control signals equal to zero.

As briefly discussed above, one manner for performing the present invention is to begin monitoring the valid vector beginning from one end of the valid vector (e.g., V[0]). Each succeeding entry within the valid vector will be checked to determine whether it is the first valid bit. V[k], beginning from V[0] is the first asserted valid bit if it is asserted and V[0] through V[k−1] are not asserted. Whenever the first valid bit is found at the kth position, a control vector $C_0$ will be sent to mux 103 with only the kth bit asserted. Control circuitry 107 will also check each asserted valid bit whether it is the second asserted valid bit by checking whether there exists only one asserted valid bit from V[0] through the valid bit immediately proceeding the valid bit of interest. For example, if the V[i] bit is found to be the second asserted valid bit from V[0], a control vector will be sent to mux 104 with only the ith bit asserted. To check whether an asserted valid bit is the Mth asserted valid bit, control circuitry 107 must determine whether there are exactly M−1 asserted valid bits prior to the asserted valid bit of interest. In summary, determining whether a kth valid bit is the ith asserted valid bit requires control circuitry 107 to check whether there are exactly i−1 asserted bits among the preceding k−1 valid bits. To do that, it requires a larger amount of logic than to find whether the kth valid bit is the leading asserted bit.

This embodiment can be described as follows. Control circuitry 107 begins with the entire valid vector, and then finds the leading asserted valid bit first. Then, control circuitry 107 finds the leading asserted valid bit from the remaining valid bits, i.e., excluding the one found in the first step. Again, after the first and the second asserted bits are found, control circuitry 107 looks for the leading asserted bit from the remaining valid bits. The procedure is reduced to only finding the leading asserted in each step with additional logic circuitry to exclude the leading asserted bits already found previously. Furthermore, the logic operation in control circuitry 107 may be implemented to find the leading asserted valid bits from both ends of the valid vector.

In an implementation of our embodiment, at each step control select signals are produced for two of the muxes, then the two leading 1's in the valid bit vector are deleted to produce a new valid bit vector for the next step. After M/2 steps, M sets of control select signals are found for all M muxes. As opposed to finding a leading 1 within the valid bit vector in only one direction in each step, this embodiment reduces the time required to select M entries by one-half. Please note that multiple steps may be carried out within one clock cycle.

Assume N valid bits V[0], . . . , V[N−1] (one for each entry). For each of the N position J, a bit vector of M elements $S_J[0, \ldots, M-1]$ is constructed such that $C_0=S_0[0].S_1[0]. \ldots .S_{N-1}[0]$ will be used to control a selection $mux_0$.

$C_1=S_0[1].S_1[1]. \ldots .S_{N-1}[1]$ will be used to control a selection $mux_1$.

$C_{M-1}=S_0[M-1].S_1[M-1]. \ldots .S_{N-1}[M-1]$ will be used to control a selection $mux_{M-1}$. The input to select lines of the mux i is the $C_i$ vector.

The control vectors $C_i$ make up an M×N matrix in which each row and each column can have only one bit on. When $S_L[k]$ is on, the Lth entry must be valid and will appear on the output of the kth mux.

The following is the algorithm to construct the M control vectors $C_i$ to be sent to the muxes. "^" designates a complement of a value. M, N, K, and L are positive integers.

From V[0], . . . V[N−1], $C_0$ is constructed (control for mux 0 (mux 103)) using the following mapping function:

$Fw[x]=Fw(V[0], \ldots, V[N-1])=(1\char`\^V[0], \char`\^(V[0]+V[1]), \ldots, \char`\^(V[0]+V[1]+ \ldots +V[N-2]))$.

Another mapping function is also used:

$Bw[x]=Bw(V[0], \ldots, V[N-1])=(\char`\^(V[1]+ \ldots +V[N-1]), \ldots, \char`\^V[N-1], 1)$ Then, $C_0=Fw(V[0], \ldots, V[N-1])$ AND $(V[0], \ldots, V[N-1])$ and $C_1=Bw(V[0], \ldots, V[N-1])$ AND $(V[0], \ldots, V[N-1])$ The operations to produce $C_0$ and $C_1$ are in parallel. Also, a new valid bit vector is produced:

$V[0], \ldots, V[N-1]=(\char`\^Fw(V[0], \ldots, V[N-1])$ AND $\char`\^Bw(V[0], \ldots, V[N-1]))$ AND $(V[0], \ldots, V[N-1]))$ The new valid bit vector V'[0], . . . , V'[N−1] is then used as input instead of V[0], . . . , V[N−1]. The output will be two other control vectors $C_2$, $C_3$ to another pair of muxes. M control vectors can be produced in M/2 steps.

The foregoing is implemented by control circuitry 107 of FIG. 1.

Figure 2:
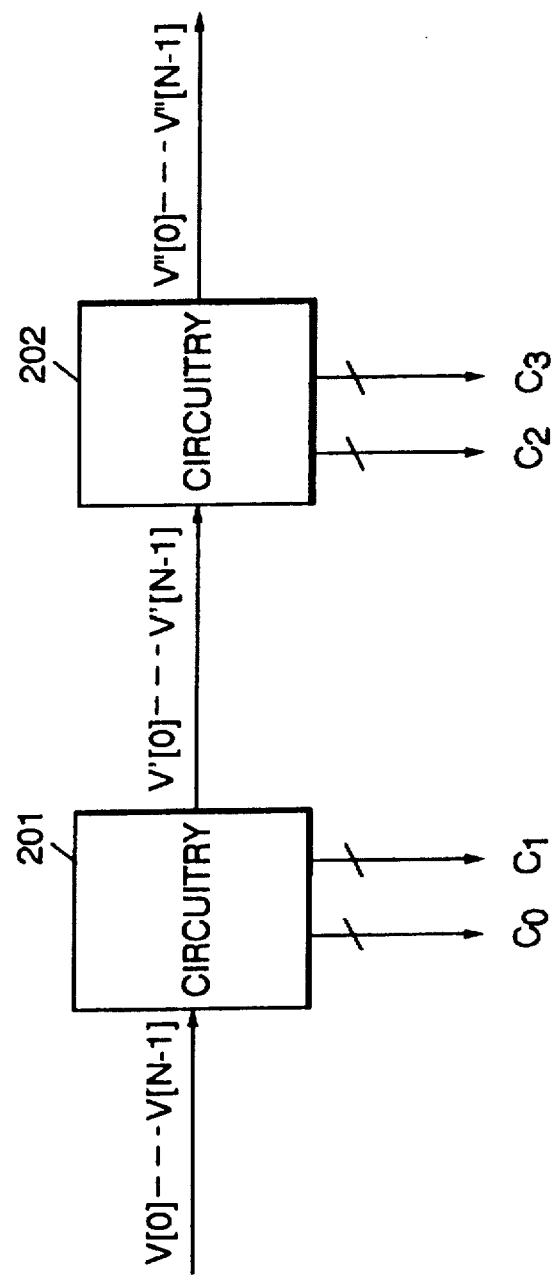
FIG. 2 illustrates in block diagram form a production of control signals in accordance with the present invention.

Referring next to FIG. 2, there is illustrated a portion of control circuitry 107, which includes circuitry 201 and circuitry 202. Circuitry 201, is further detailed and discussed below with respect to FIG. 3. Circuitry 201 receives valid bit vector V[0], . . . , V[N−1] and produces control vectors $C_0$ and $C_1$, and the new valid bit vector V'[0], . . . , V'[N−1].

Essentially, the new valid bit vector comprises the entries within the valid bit vector minus the entries on each end of the valid bit vector beginning with each end and including each entry up to the asserted valid bits found by circuitry 201. In other words, the present invention will receive the valid bit vector V[0], . . . , V[N−1] and will then produce control signal vector $C_0$ when the first asserted valid bit within the valid bit vector beginning from one end V[0] of the valid bit vector is found. Control signal vector $C_1$ will be produced when an asserted valid bit is found within the valid bit vector beginning from the other end V[N−1] of the valid bit vector. The new valid bit vector will comprise those valid bits remaining between the first found asserted valid bits including any remaining asserted and negated valid bits.

As an example, suppose that N=8, i.e., array 100 is an 8-entry storage array. There may be a valid bit associated with each of the eight entries. Suppose also that there is an asserted valid bit associated with entries 1, 3, 4 and 6 of array 100 (i.e., V[1]=V[3]=V[4]=V[6]=1). Therefore, the valid bit vector will be [0,1,0,1,1,0,1,0]. Control circuitry 107 will begin by starting with entry V[0], and proceed along the valid bit vector until reaching an asserted valid bit, which in this case occurs at entry V[1]. Control circuitry 107 will also do the same beginning with entry V[N−1] and proceed along the valid bit vector in the reverse direction until reaching a valid bit, which in this example is at V[6]. The result is that control signal vector $C_0$ will have the following value: [0,1,0,0,0,0,0,0]. This will cause mux 103 to select the second entry within array 100 for output.

Control signal vector $C_1$ will be: [0,0,0,0,0,0,1,0], which will be sent to mux 104, causing it to select the seventh entry from array 100 for output from mux 104.

Then, circuitry 201 will produce the new valid bit vector which is derived from the original valid bit vector except that entries V'[0], V'[1], V'[6] and V'[7] will be negated, and the rest of the bits, V'[2], . . . , V'[5] will be equal to V[2], . . . , V[5], respectively. This new valid bit vector will be inputted into circuitry 202, which is similar to circuitry 201 for producing control signal vectors $C_2$ and $C_3$ to be sent to the next two muxes, which in this example are muxes 105 and 106. Circuitry 201 and 202 implement the first and second steps of the procedure. More circuitry may be needed if more than four valid entries are to be retrieved. The first of the succeeding stages will use as input the vector V"[0], . . . , V"[N−1] generated by circuit 202.

Figure 3A:
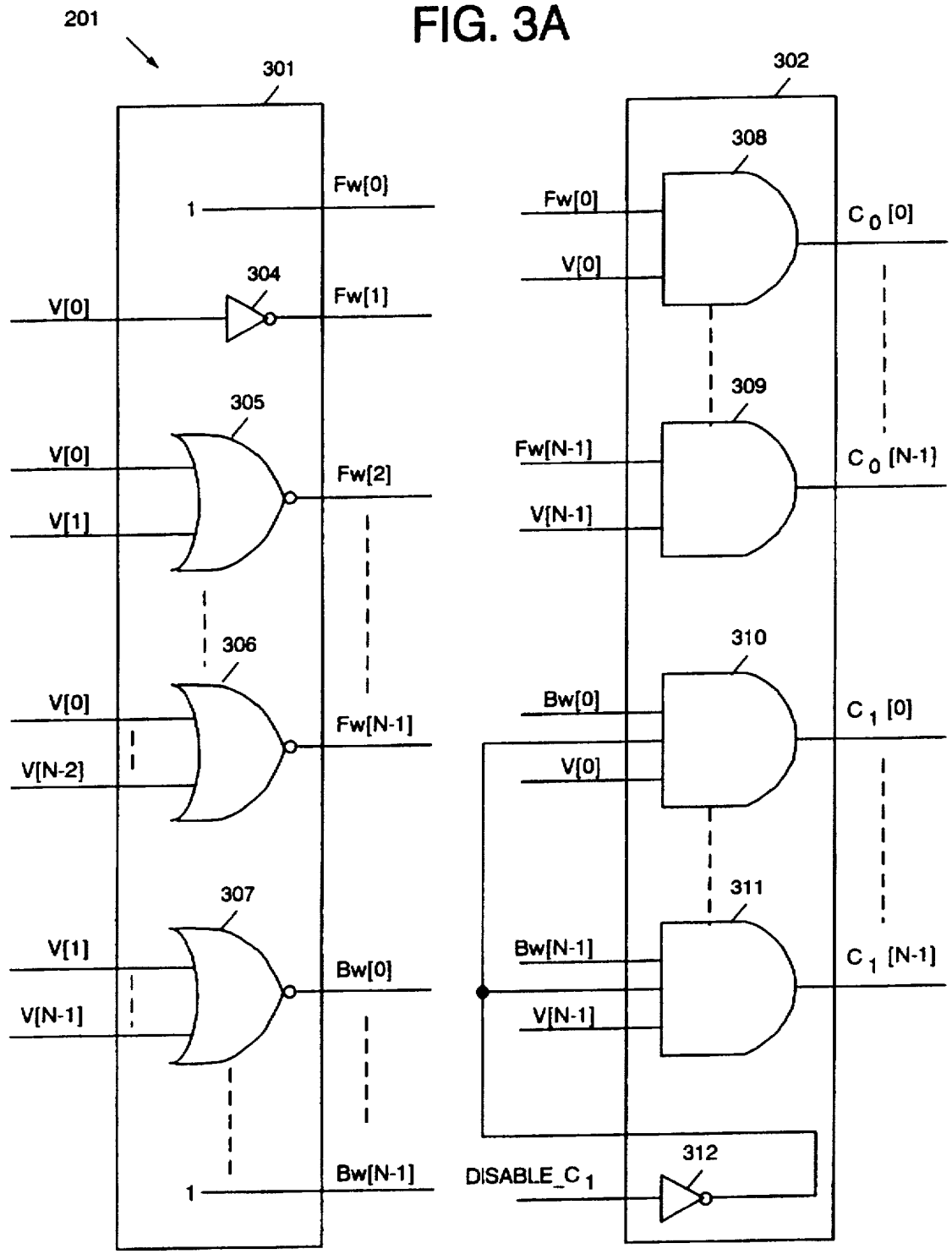
FIGS. 3A-C illustrate a logic circuit diagram of one embodiment of the present invention.
Figure 3B:
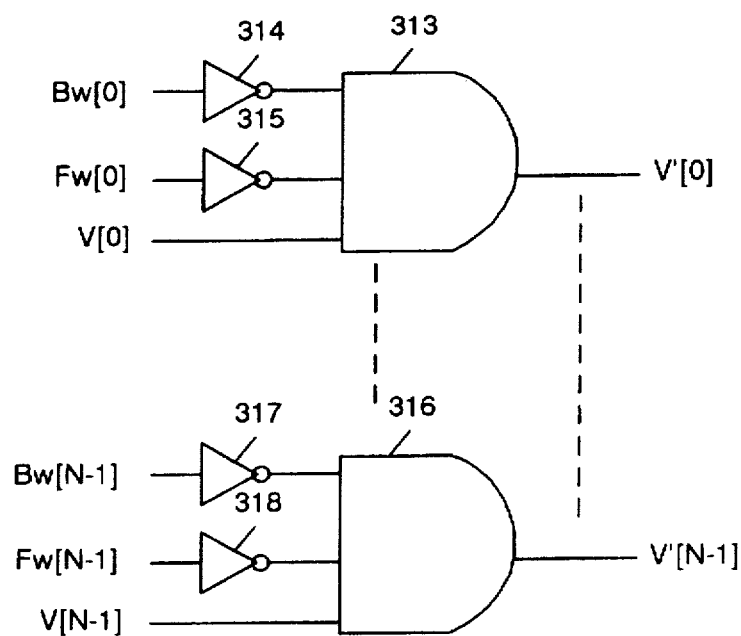
Figure 3C:
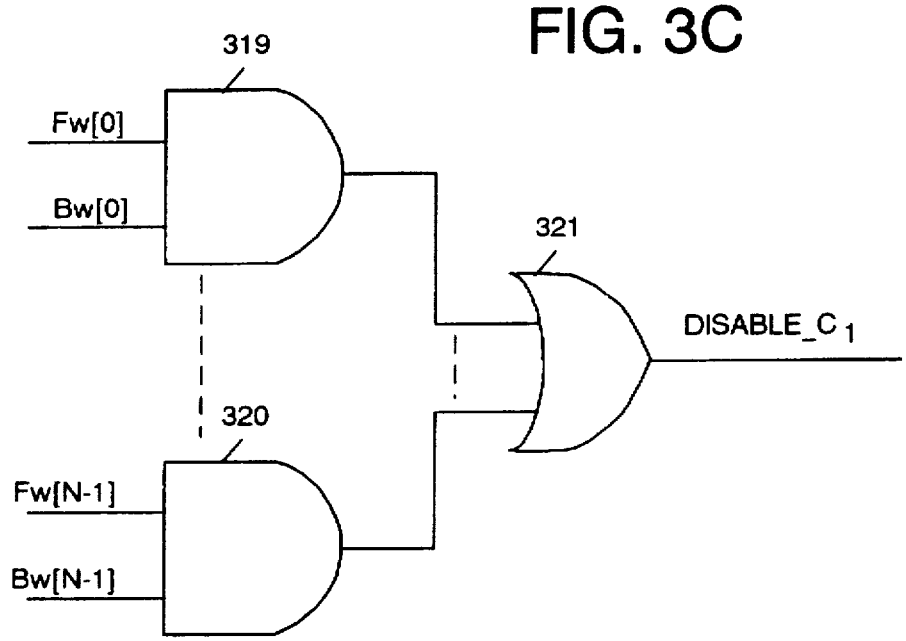

Referring next to FIG. 3, there is shown more detail of circuitry 201. Note, the circuitry shown in FIG. 3 is likewise implemented for circuitry 202.

Circuitry 301 illustrates the transformation of the valid bit vector V[0], . . . , V[N−1] into what are referred to as the forward and backward mapping functions (Fw[x], Bw[x]), as discussed above. The forward mapping function Fw[x]=Fw(V[0], . . . , V[N−1]) is produced by various logical combinations of the valid bit vector. Fw[0] is a logic "1". Fw[1] is produced by inverting, with inverter 304, V[0]. Fw[2] is produced by a logical NOR operation using NOR gate 305, which receives V[0] and V[1]. Fw[N−1] is produced by NOR gate 306 receiving V[0], . . . , V[N−2]. The remainder of the N entries of Fw[x] are likewise produced in a similar manner by NOR gates (not shown).

Mapping function Bw[x]=Bw(V[0], . . . , V[N−1]) is produced in a similar manner. Bw[N−1] is an asserted bit. Bw[0] is produced, by NOR gate 307 receiving V[1], . . . , V[N−1]. The remaining entries of Bw[x] are produced by similar NOR gates (not shown), in accordance with the equation of the mapping function shown above.

Circuitry 302 produces the control signal vectors $C_0$ and $C_1$. $C_0$[0] is produced by AND gate 308 receiving Fw[0] and V[0]. $C_0$[1] is likewise produced by an AND gate (not shown) receiving Fw[1] and V[1]. $C_0$[N−1] is produced by AND gate 309 receiving Fw[N−1] and V[N−1]. The other entries of $C_0$ lying between the shown $C_0$[0] and $C_0$[N−1] are produced by a similar means. $C_1$[0] is produced by AND gate 310 receiving Bw[0] and V[0]. Likewise, $C_1$[N−1] is produced by AND gate 311 receiving Bw[N−1] and V[N−1]. The other entries of $C_1$ lying between $C_1$[0] and $C_1$[N−1] are similarly produced.

Note, that each of the AND gates used in producing $C_1$ also receive the output of inverter 312, which receives the signal Disable_$C_1$. In some steps $C_0$ and $C_1$ may be identical. This may happen in two cases, either the input vector to the particular stage implemented has only one bit asserted (this happens when the valid bit vector to the first stage has an odd number of asserted valid bits, and the number of asserted bits are less than M), or the input vector has all negated bits. If the input vector is a zero vector, $C_0$ and $C_1$ will also be zero and the rest of the steps all produce zero control vectors. If the input vector has only one bit asserted, then either $C_0$ or $C_1$ is to be reset. The solution is to look for, in a bit position, whether ^Fw and ^Bw are both 0 or Fw and Bw are both 1. If the answer is yes, the $C_1$ bits are all driven to zero. Therefore, $C_1$ needs to be qualified by this condition.

Disable_$C_1$ is produced by a parallel configuration of AND gates 319 . . . 320 each receiving two signals. Shown is AND gate 319 receiving Fw[0] and Bw[0] and AND gate 320 receiving Fw[N−1] and Bw[N−1]. Other AND gates not shown will receiving similar values. The outputs of all of these AND gates 319 . . . 320 are then received by OR gate 321 producing the Disable_$C_1$ signal. The result of this is that if the mapping functions Fw and Bw are identical, then the output of OR gate 321 will be an asserted bit for Disable_$C_1$. This asserted bit will be negated by inverter 312 resulting in the outputs of AND gates 310 . . . 311 being driven to all zeros. An alternative to using Disable_$C_1$ to drive all output bits of $C_1$ to zero is to drive zero the valid bit of the entry selected by $C_1$. This will reduce the N 3-input AND gates to N 2-input N gate at the cost of a 2-input AND gate which receives the Disable_$C_1$ signal and the valid bit of the entry at the output of the mux selected by $C_1$.

The last portion of circuitry 201 is the AND gates 313 . . . 316 producing the new valid bit vector V'[0], . . . , V'[N−1]. Shown is AND gate 313 for producing V'[0], receiving V[0], the output of inverter 314, which receives Bw[0], and the output of inverter 315, which inverts Fw[0].

V'[N−1] is similarly produced by AND gate 316, which receives V[N−1], the output of inverter 317, which inverts Bw[N−1], and the output of inverter 318, which inverts Fw[N−1].

As discussed above, and referring back to FIG. 2, if there are more than two entries (M>2) to be selected from array 10, then the new valid bit vector (V'[0], . . . , V'[N−1]) will be inputted to circuitry 202, which is similar to circuitry 201, to produce $C_2$ and $C_3$.

Although the present invention and its advantages have been described in detail, it should be understood that various changes, substitutions and alterations can be made herein without departing from the spirit and scope of the invention as defined by the appended claims.

What is claimed is:

1. An apparatus for selecting M entries from an N-entry array, wherein M and N are positive integers, said apparatus comprising:

circuitry for monitoring one or more bits of each entry of said N-entry array;

circuitry, coupled to said monitoring circuitry, for selecting M entries from said N-entry array having a predetermined pattern of said one or more bits; and circuitry, coupled to said selecting circuitry, for outputting said M entries selected from said N-entry array having said predetermined pattern of said one or more bits, wherein said selecting circuitry further comprises:

circuitry for selecting a first one of said M entries having said predetermined pattern of said one or more bits occurring from a first end of said N-entry array; and circuitry for selecting a first one of said M entries having said predetermined pattern of said one or more bits occurring from a second end of said N-entry array.

2. The apparatus as recited in claim 1, wherein M≧2, and wherein said selecting circuitry selects said M entries having said predetermined pattern of said one or more bits beginning at one end of said N-entry array.

3. The apparatus as recited in claim 1, wherein said first and second ends of said N-entry array are at opposite ends of said N-entry array.

4. The apparatus as recited in claim 3, wherein said outputting circuitry further comprises first and second multiplexors each coupled to said each entry of said N-entry array, and wherein said circuitry for selecting said first one of said M entries having said predetermined pattern of said one or more bits occurring from said first end of said N-entry array produces a first control signal causing said first multiplexor to output said first one of said M entries having said predetermined pattern of said one or more bits occurring from said first end of said N-entry array from said N-entry array, and wherein said circuitry for selecting said first one of said M entries having said predetermined pattern of said one or more bits occurring from said second end of said N-entry array produces a second control signal causing said second multiplexor to output said first one of said M entries having said predetermined pattern of said one or more bits occurring from said second end of said N-entry array from said N-entry array.

5. The apparatus as recited in claim 4, wherein said circuitry for selecting M entries from said N-entry array having said predetermined pattern of said one or more bits further comprises:

circuitry for selecting a second one of said M entries having said predetermined pattern of said one or more bits occurring from said first end of said N-entry array.

6. The apparatus as recited in claim 5, wherein said circuitry for selecting M entries from said N-entry array having said predetermined pattern of said one or more bits further comprises:

circuitry for selecting a second one of said M entries having said predetermined pattern of said one or more bits occurring from said second end of said N-entry array.

7. The apparatus as recited in claim 6, wherein said second one of said M entries having said predetermined pattern of said one or more bits occurring from said first end of said N-entry array and said second one of said M entries having said predetermined pattern of said one or more bits occurring from said second end of said N-entry array are a same entry.

8. The apparatus as recited in claim 7, wherein said outputting circuitry further comprises third and fourth multiplexors each coupled to said each entry of said N-entry array, and wherein said circuitry for selecting said second one of said M entries having said predetermined pattern of said one or more bits occurring from said first end of said N-entry array produces a third control signal causing said third multiplexor to output said second one of said M entries having said predetermined pattern of said one or more bits occurring from said first end of said N-entry array from said N-entry array, and wherein said circuitry for selecting said second one of said M entries having said predetermined pattern of said one or more bits occurring from said second end of said N-entry array produces a fourth control signal causing said fourth multiplexor to output said second one of said M entries having said predetermined pattern of said one or more bits occurring from said second end of said N-entry array from said N-entry array.

9. The apparatus as recited in claim 1, wherein said first one of said M entries having said predetermined pattern of said one or more bits occurring from said first end of said N-entry array and said first one of said M entries having said predetermined pattern of said one or more bits occurring from said second end of said N-entry array are a same entry.

10. An apparatus comprising:

a storage array having N entries of K bits each;

a valid vector wherein each entry of said valid vector is associated with one of said N entries of said storage array;

M multiplexors each coupled to said storage array, wherein each of said M multiplexors has N inputs coupled to corresponding ones of said N entries of said storage array, and wherein said each of said M multiplexors has a K-bit output; and control circuitry coupled to said valid vector and to said each of said M multiplexors, wherein said control circuitry further comprises:

circuitry for receiving said valid vector;

circuitry for finding first entries of said valid vector from both ends of said valid vector having a preselected value; and circuitry for producing first and second control signals to be sent to first and second ones of said M multiplexors causing said first and second ones of said M multiplexors to select from said storage array and output from said K-bit outputs entries of said N entries of said storage array corresponding to said first entries of said valid vector having said preselected value.

11. The apparatus as recited in claim 10, wherein said control circuitry further comprises:

circuitry for producing a new valid vector from said valid vector by deleting said first entries of said valid vector having said preselected value and those entries of said valid vector occurring between said first entries and said both ends of said valid vector;

circuitry for finding first entries of said new valid vector from both ends of said new valid vector having said preselected value; and circuitry for producing third and fourth control signals to be sent to third and fourth ones of said M multiplexors causing said third and fourth ones of said M multiplexors to select from said storage array and output from said K-bit outputs entries of said N entries of said storage array corresponding to said first entries of said new valid vector having said preselected value.

12. The apparatus as recited in claim 11, wherein said first entries of said new valid vector are a same entry of said new valid vector, and wherein said fourth control signal is therefore suppressed.

13. The apparatus as recited in claim 10, wherein said first control signal is an N-entry vector wherein said producing circuitry further comprises:

a first AND gate receiving a first entry of said valid vector and an asserted bit and outputting a first entry of said first control signal; and a second AND gate receiving a second entry of said valid vector and an inverse of said first entry of said valid vector and outputting a second entry of said first control signal.

14. The apparatus as recited in claim 13, wherein said producing circuitry further comprises:

a NOR gate receiving said first and second entries of said valid vector; and a third AND gate receiving a third entry of said valid vector and an output of said NOR gate and outputting a second entry of said first control signal.

15. A method for selecting M entries from an N-entry array, wherein M and N are positive integers, said method comprising the steps of:

a) monitoring one or more bits of each entry of said N-entry array;

b) selecting a first one of said M entries having a predetermined pattern of said one or more bits occurring from a first end of said N-entry array;

c) selecting a first one of said M entries having said predetermined pattern of said one or more bits occurring from a second end of said N-entry array;

d) in response to step b), producing a first control signal causing a first multiplexor to output said first one of said M entries having said predetermined pattern of said one or more bits occurring from said first end of said N-entry array from said N-entry array; and e) in response to step c), producing a second control signal causing a second multiplexor to output said first one of said M entries having said predetermined pattern of said one or more bits occurring from said second end of said N-entry array from said N-entry array.

16. The method as recited in claim 15, further comprising the steps of:

f) selecting a second one of said M entries having said predetermined pattern of said one or more bits occurring from said first end of said N-entry array; and g) selecting a second one of said M entries having said predetermined pattern of said one or more bits occurring from said second end of said N-entry array.

17. The method as recited in claim 15, further comprising the steps of:

h) in response to step f), producing a third control signal causing a third multiplexor to output said second one of said M entries having said predetermined pattern of said one or more bits occurring from said first end of said N-entry array from said N-entry array; and i) in response to step g), producing a fourth control signal causing a fourth multiplexor to output said second one of said M entries having said predetermined pattern of said one or more bits occurring from said second end of said N-entry array from said N-entry array.

\* \* \* \* \*